(12) United States Patent
Hoffman et al.

(10) Patent No.: US 10,000,957 B2
(45) Date of Patent: Jun. 19, 2018

(54) DOOR CLOSER ASSEMBLY

(71) Applicant: HAMPTON PRODUCTS INTERNATIONAL CORPORATION, Foothill Ranch, CA (US)

(72) Inventors: Kari Jo Hoffman, Shell Lake, WI (US); Michael J. Gianoli, Shell Lake, WI (US); Jason L. Quinn, Spooner, WI (US); Lucas Jeffrey Stanton, Stone Lake, WI (US)

(73) Assignee: Hampton Products International Corporation, Foothill Ranch, CA (US)

( * ) Notice: Subject to any disclaimer, the term of this patent is extended or adjusted under 35 U.S.C. 154(b) by 267 days.

(21) Appl. No.: 15/186,229

(22) Filed: Jun. 17, 2016

(65) Prior Publication Data

US 2016/0290026 A1    Oct. 6, 2016

Related U.S. Application Data

(62) Division of application No. 14/550,850, filed on Nov. 21, 2014, now Pat. No. 9,388,618.

(51) Int. Cl.
*E05F 1/10* (2006.01)
*E05F 3/22* (2006.01)
(Continued)

(52) U.S. Cl.
CPC .................. *E05F 1/10* (2013.01); *E05F 3/04* (2013.01); *E05F 3/22* (2013.01); *E05F 3/227* (2013.01);
(Continued)

(58) Field of Classification Search
CPC ........... E05Y 2600/56; E05Y 2600/626; E05Y 2800/17–2800/172; E05Y 2600/00;
(Continued)

(56) References Cited

U.S. PATENT DOCUMENTS

| | | | |
|---|---|---|---|
| 22,441 | A | 12/1858 | Mayall |
| 66,843 | A | 7/1867 | Hughes |

(Continued)

OTHER PUBLICATIONS

Non-Final Office Action on co-pending U.S. Appl. No. 15/204,239 dated Dec. 11, 2017.

*Primary Examiner* — Matthew P Travers
(74) *Attorney, Agent, or Firm* — Klein, O'Neill & Singh, LLP

(57) ABSTRACT

A method of installing a replacement door closer assembly including a closer mechanism includes the steps of: (a) removing a previous door closer assembly from a mounting surface of a door or a door jamb; (b) fixing a first mounting bracket on the mounting surface through a first pre-existing mounting hole; (c) extending the closer mechanism of the replacement door closer assembly through the first mounting bracket while aligning a second mounting bracket with at least a second pre-existing mounting hole in the mounting surface; (d) sliding the closer mechanism back toward the first mounting bracket so that the second mounting bracket can be fixed to the mounting surface through the second pre-existing mounting hole; and (e) positioning and securing the closer mechanism between the first and second mounting brackets.

18 Claims, 9 Drawing Sheets

(51) Int. Cl.
*E05F 3/04* (2006.01)
*B23P 6/00* (2006.01)
*E05F 3/00* (2006.01)

(52) U.S. Cl.
CPC . *B23P 6/00* (2013.01); *E05F 3/00* (2013.01); *E05Y 2600/12* (2013.01); *E05Y 2600/45* (2013.01); *E05Y 2600/46* (2013.01); *E05Y 2600/502* (2013.01); *E05Y 2600/56* (2013.01); *E05Y 2600/626* (2013.01); *E05Y 2900/132* (2013.01); *Y10T 29/4973* (2015.01)

(58) Field of Classification Search
CPC ............ E05Y 2600/45; E05Y 2600/50; E05Y 2600/502; E05Y 2600/51; E05Y 2600/46; E05D 11/0009; E05D 11/06; E05F 1/10; E05F 1/1091; E05F 1/1041–1/1075; E05F 3/22; E05F 3/225; E05F 3/227; B23P 6/00; B23P 2700/08; Y10T 29/4973; Y10T 29/49963–29/49964
See application file for complete search history.

(56) References Cited

U.S. PATENT DOCUMENTS

| | | |
|---|---|---|
| 129,574 A | 7/1872 | Losee |
| 625,495 A | 5/1899 | Fernald |
| 3,888,445 A | 6/1975 | Pence |
| 4,086,681 A * | 5/1978 | Nakanishi ................. E05F 3/00 16/49 |
| 4,648,151 A | 3/1987 | Whaley |
| 5,152,487 A | 10/1992 | Defatte et al. |
| 5,392,562 A * | 2/1995 | Carambula ............... E05F 3/22 248/300 |
| 5,495,639 A | 3/1996 | Wartian |
| 6,298,520 B1 * | 10/2001 | Blickhahn ................. E05F 3/22 16/49 |
| 6,397,431 B1 | 6/2002 | Alonso |
| 6,634,059 B2 | 10/2003 | Seiferd |
| 6,640,387 B2 | 11/2003 | Alonso |
| D605,496 S | 12/2009 | Scheuermann et al. |
| 7,670,216 B2 | 3/2010 | Chilelli et al. |
| 7,698,796 B1 * | 4/2010 | Dowling ................. E05F 3/22 29/402.08 |
| 7,971,316 B2 | 7/2011 | Copeland, II et al. |
| 8,169,169 B2 | 5/2012 | Hass et al. |
| D715,129 S | 10/2014 | Quinn et al. |
| 8,864,087 B2 | 10/2014 | Goldin et al. |
| D746,128 S | 12/2015 | Stanton |
| 9,388,618 B2 | 7/2016 | Hoffman et al. |
| 2007/0157426 A1 | 7/2007 | Tillmann |
| 2007/0256275 A1 | 11/2007 | Winkler |
| 2013/0227815 A1 | 9/2013 | Wulbrandt |

* cited by examiner

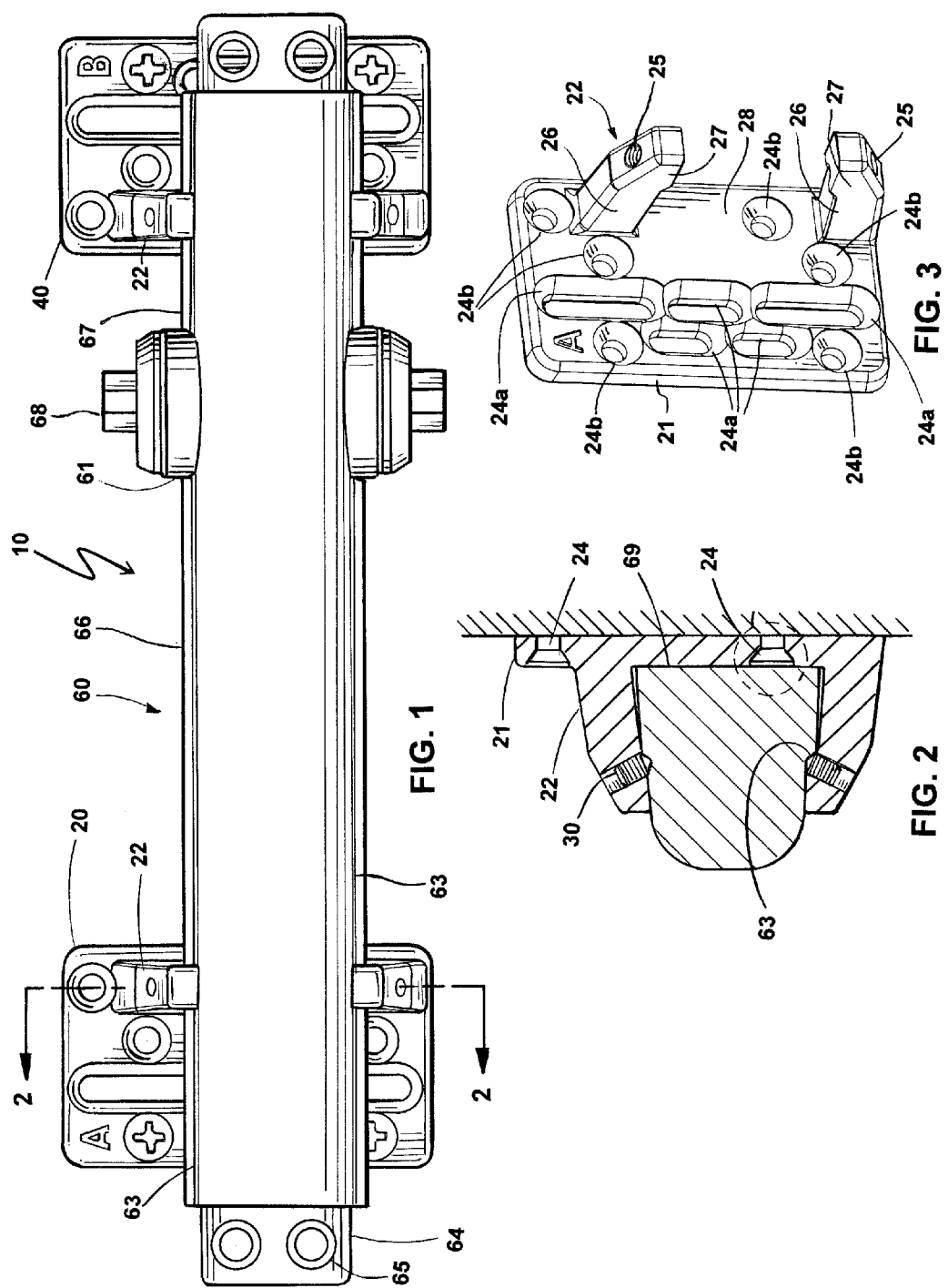

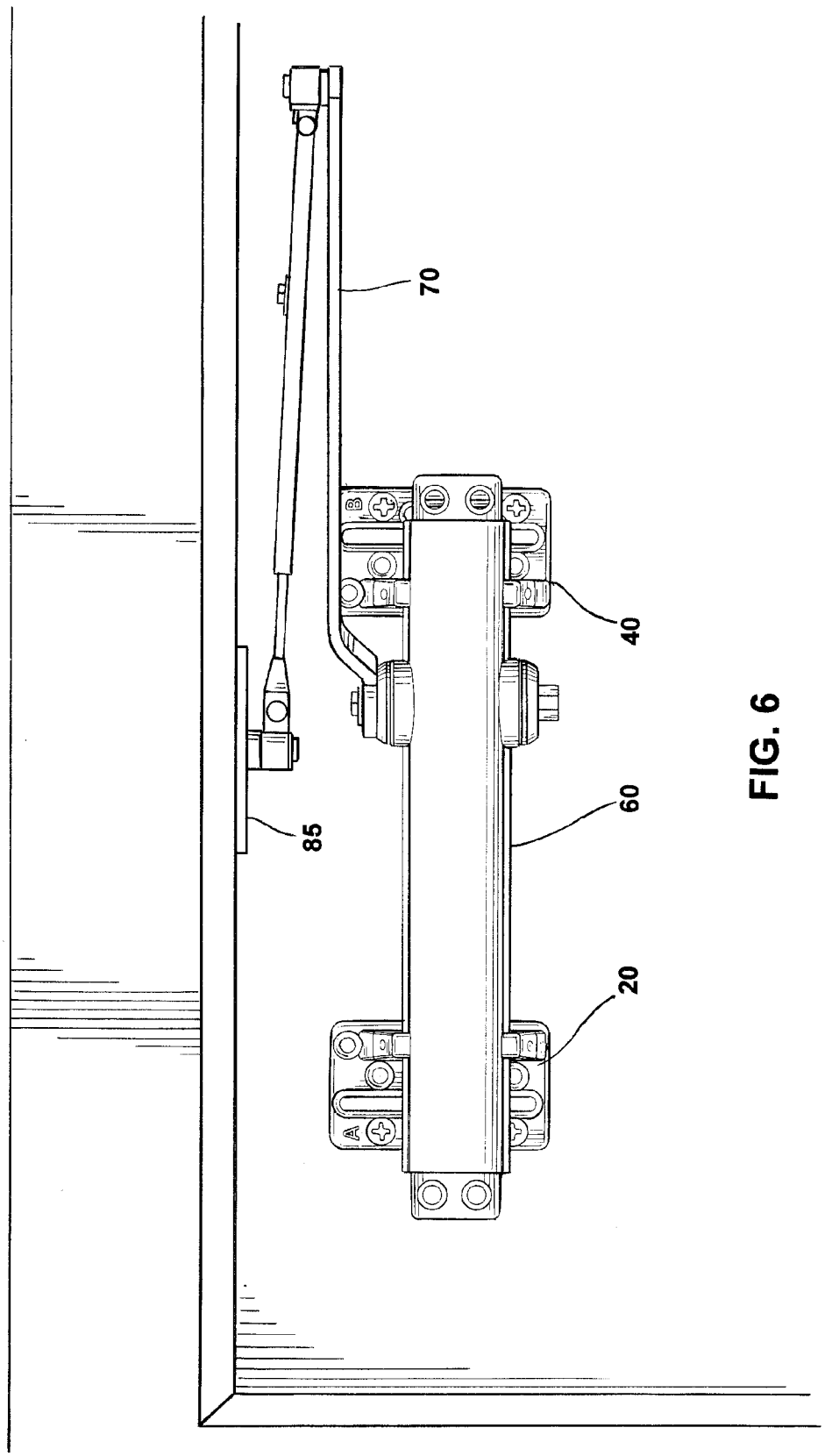

DOOR CLOSER ASSEMBLY

CROSS REFERENCE TO RELATED APPLICATIONS

This application is a divisional of co-pending application Ser. No. 14/550,850, filed Nov. 21, 2014, the disclosure of which is incorporated herein by reference.

FEDERALLY SPONSORED RESEARCH OR DEVELOPMENT

Not Applicable

BACKGROUND

The present disclosure relates to commercial and residential door closers and universal mounting brackets thereof that provide for easy installation of the closer using pre-existing mounting holes already present in the door or jamb.

There is a consistent problem of degraded door integrity and complexity in installation when replacing a worn door closer with a new closer having a different mounting hole-pattern. Currently, products on the market have a wide variety of mounting hole-patterns. When replacing a door closer, the user must purchase a product that has exactly the same hole-patterns, make use of a heavy cumbersome adapter plate (only applicable for some models), or drill and tap new holes in door to accommodate the mounting hole-pattern of the new closer. Drilling and tapping of mounting holes requires certain equipment and a higher level of skill than what many non-professional installers possess. Further, installation of a door closer having a different hole-pattern or mounting bracket design often leaves exposed unused holes that are unattractive and that may reduce the strength and structural integrity of the door's mounting surface.

SUMMARY

The various embodiments of the present door closer assembly and associated methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

The present door closer assembly includes a pair of universal mounting brackets and a closer for replacement of a previously-installed closer and its mounting devices, while utilizing existing mounting points already on the door so that new mounting holes are not required to complete the closer installation. The term "universal," as used in connection with the mounting brackets described herein, means "attachable to a mounting surface at any of a variety of patterns of pre-existing mounting points in the mounting surface." This function is achieved in an embodiment of the disclosure, by providing the mounting brackets with a combination of mounting openings (holes and/or slots) that may be selectively aligned with any of the variety of patterns of pre-existing mounting points.

The present door closer assembly provides for do-it-yourself ("DIY") installation of a low cost universal mounting system that allows the installer to use existing mounting hole-patterns for efficient and effective mounting of the closers. The two universal mounting brackets of the improved mounting device provide a universal mount capability that is adaptable to align the mounting brackets vertically and the closer horizontally, making the installation easy and secure. It may be appreciated that the present closer is not limited to being aligned strictly in a horizontal direction parallel to the floor or the ground, but can be at any angle with respect to the floor or ground.

According to one aspect of the present disclosure, a door closer assembly that is mountable on a mounting surface with one of a plurality of patterns of pre-existing mounting holes, comprises a closer housing having first and second opposed ends, a first universal mounting bracket, and a second universal mounting bracket. The first universal mounting bracket is configured to retain the closer housing at the first end thereof, and a second universal mounting bracket is configured to retain the closer housing at the second end thereof. Each of the first and second universal mounting brackets have a plurality of mounting openings arranged in a pattern in which at least one of the mounting openings is alignable with at least one of the pre-existing mounting holes in any two or more of the plurality of patterns.

According to another aspect of the present disclosure, a door closer assembly configured for replacing a previous door closer assembly and using pre-existing mounting holes in the door or the door jamb, comprises a closer having a closer housing and a pair of universal mounting brackets. The closer housing has at least one abutment surface along an axis of the closer. The universal mounting brackets are mounted at opposite end portions of the closer housing. Each of the universal mounting brackets has a plurality of mounting openings and a securing portion. Each of the plurality of mounting openings aligns with at least one of the pre-existing mounting holes, and the securing portion is configured for gripping the closer. The closer is slidable along the securing portions.

According to yet another aspect of the present disclosure, a method of replacing and installing a door closer assembly comprises removing a previous door closer assembly from a mounting surface on either a door or a door jamb, orienting a first universal mounting bracket relative to at least a first pre-existing mounting hole in the mounting surface from the previous door closer assembly, fixing the first universal mounting bracket to the mounting surface through the at least first pre-existing mounting hole, sliding a closer through the first universal mounting bracket, orienting a second universal mounting bracket relative to at least a second pre-existing mounting hole in the mounting surface, sliding the closer back towards the first universal mounting bracket, fixing the second universal mounting bracket to the mounting surface through the at least second pre-existing mounting hole, positioning the closer by sliding the closer between the first and second universal mounting brackets, and securing the closer to the first and second universal mounting brackets at a final position.

BRIEF DESCRIPTION OF THE DRAWINGS

The various embodiments of the present disclosure will be discussed in detail with an emphasis on highlighting the advantageous features. These embodiments depict the novel and non-obvious features and associated methods shown in the accompanying drawings, which are for illustrative purposes only. These drawings include the following figures, in which like numerals indicate like parts:

FIG. 1 is a front perspective view of a door closer assembly in accordance with embodiment of this disclosure, the door closer assembly including first and second universal mounting brackets and a closer body;

FIG. 2 is a cross-sectional view of the first universal mounting bracket and the closer body, taken through the line 2-2 in FIG. 1;

FIG. 3 is a front perspective view of the first universal mounting bracket of FIG. 1.

FIG. 6 is a front elevation view of the door closer assembly with a parallel closer arm, with the closer housing mounted on a door in a first door-mount installation, with the closer arm attached to a door jamb;

DETAILED DESCRIPTION

Figure 4:
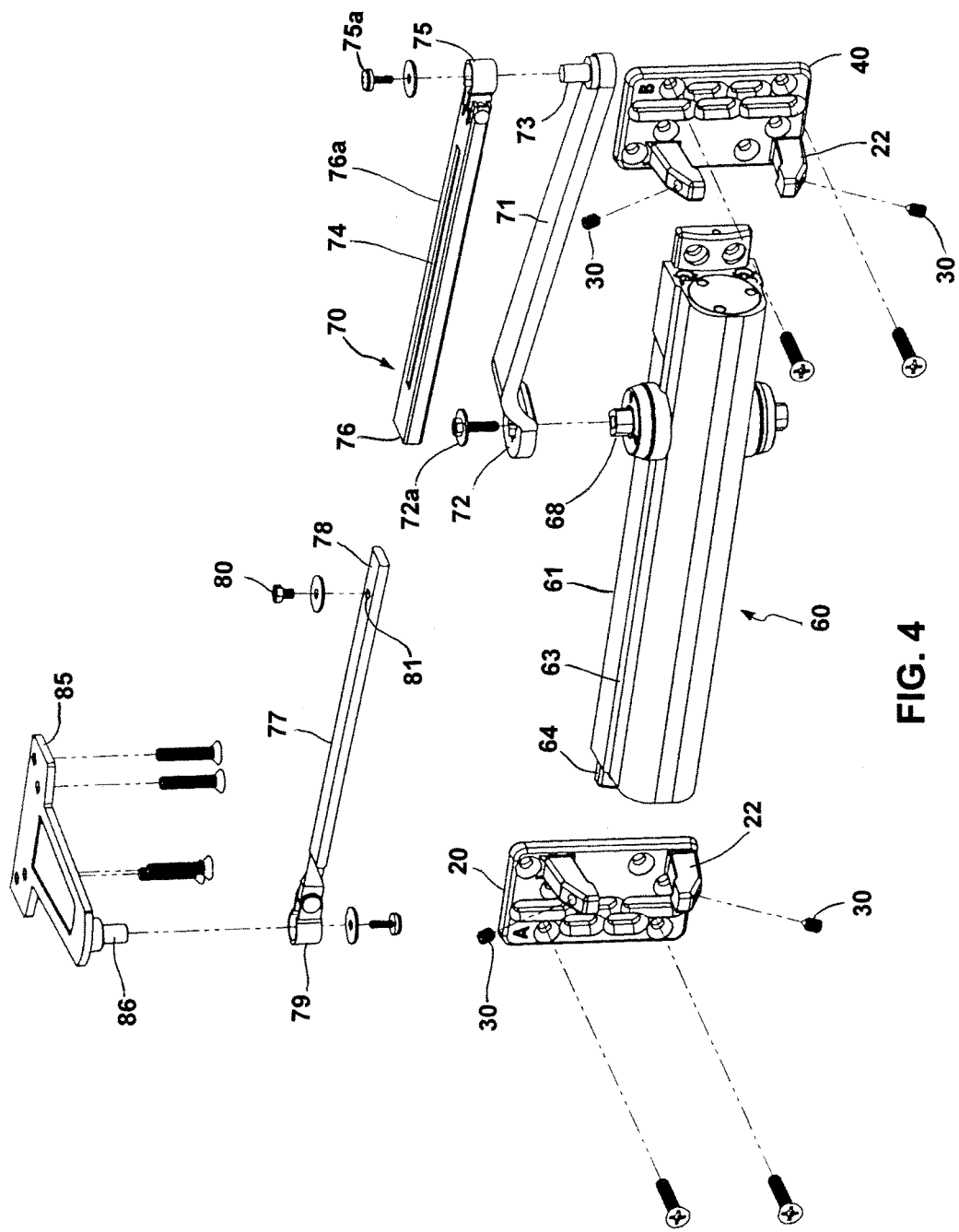
FIG. 4 is an exploded front perspective view of the door closer assembly of FIG. 1 with a parallel closer arm.

FIG. 1 illustrates one embodiment of the present door closer assembly 10. The door closer assembly 10 includes a closer 60 (which may be referred to as a "replacement closer" if it is used to replace a previously-installed closer), a first universal mounting bracket 20, and a second universal mounting bracket 40. (The term "universal," as used in this disclosure, is defined above.) The universal mounting brackets 20, 40 are used to mount and secure the closer 60 to a mounting surface, such as a door or a door frame member, particularly a top door jamb.

The closer 60 includes a closer mechanism (not shown) housed in a closer housing 61. Commercial and residential door closer mechanisms, and their function/operation/construction, are well known in the market. These well-known closer mechanisms are incorporated herein without further elaboration on their typical capabilities, function, and operation.

The first and second universal mounting brackets 20, 40 are advantageously in an embodiment of this disclosure, mirror images of each other. In other embodiments, they may be identical, or substantially different from each other. The first and second brackets 20, 40 each include a securing portion 22, configured to engage and grip the closer housing 61. For simplicity, features described for the first universal mounting bracket 20 also apply to the second universal mounting bracket 40.

The closer housing 61 has one or more abutment surfaces 63 that extend outwardly and run parallel to a longitudinal axis of the closer housing 61. In the illustrated embodiment, there are two abutment surfaces 63 positioned on opposed sides of the housing 61 and are aligned symmetrically relative to each other and extending the entire length of the closer housing 61. Each of the abutment surfaces 63 can be a ridge, a series of flat surfaces, a curved surface, or any other shape engaging and aligning with the securing portions 22 of the first and second universal mounting brackets 20, 40. The abutment surfaces 63 allow for side-to-side adjustability of the closer 60. The closer housing 61 with the abutment surfaces 63 can be formed from a casting, such as die-casting. Thus, no secondary machining is required to produce the abutment surface 63, but can be performed if necessary. The closer housing 61 can also be fabricated by other means such as joining two or more housing pieces, and sheet metal forming with minimal or no post-machining required.

The closer 60 can further include a pair of mounting tabs 64 at opposite ends of the closer housing 61 for first time installations, when the universal mounting brackets are not required. The mounting tabs 64 have mounting holes 65 to mount the closer 60 directly to a door, jamb, frame, or other mounting surface. A rotation gear 68 of the closer mechanism extends out of the closer housing 61. The location of the rotation gear 68 divides the closer into a first portion 66 and a second portion 67. As shown, the first portion 66 is longer than the second portion 67. In some embodiments, the long portion 66 can be substantially equal in length to the short portion 67. The abutment surfaces 63 can be discontinuous at or near the rotation gear 63, in some embodiments.

Referring also to FIGS. 2 and 3, the securing portion 22 of the first and second universal mounting brackets 20, 40 is configured for supporting and securing the closer housing 61. The securing portion 22 can also provide a clamping or biasing force exerted on the closer housing 61 to retain the closer in the desired final location. For example, the securing portion 22 can be a pair of retention arms 26 extending from a front surface 28 of a base 21 of each of the first and second universal mounting brackets 20, 40. Each retention arm 26 can terminate in a securing lip 27. In the illustrated embodiment, the securing lips 27 at the end of each retention arm 26 are facing each other. The securing lips 27 can be configured to provide a slip-fit for the closer housing 61, and act as sliding guides for the abutment surfaces 63 on the closer housing 61. The engagement between the securing lips 27 and the abutment surfaces 63 can also restrain the closer housing 61 in a direction other than along the longitudinal axis of the closer. The securing lips 27 and/or the corresponding abutment surfaces 63 can have a saw-tooth or other configuration to provide further grip/resistance to movement between the closure housing 61 and the securing portions 22 of the first and second universal mounting brackets 20, 40 after the closer 60 is in its final position.

Alternatively, the securing lip 27 can also be present in one retention arm 26 or neither retention arm. For example, the retention arms 26 can be spaced apart a distance slightly smaller than or equal to a narrow width of the closer housing 61, such that the closer housing 61 forms an interference fit between the pair of retention arms 26. In some embodiments, the retention arms 26 can act as cantilevered spring arms to grip and secure the closer housing 61.

One or both of the retention arms 26 may be provided with at least one retention aperture 25, preferably a threaded aperture configured to receive a mating threaded fixing element 30, which may advantageously be a set-screw, as shown in FIG. 3. The fixing elements 30, when threaded or otherwise installed into their respective retention apertures 25, engage with the closer housing 61. Advantageously, the retention apertures 25 are set at an inwardly-directed angle (e.g., an acute angle or about 20°-60°, preferably about 30°, relative to the plane of the base 21 in some embodiments), whereby the fixing elements 30, when threaded into their respective apertures 25 so as to bear against the housing 61, and urge the housing 61 against the front surface 28 of the base 21.

In the illustrated embodiment, the closer 60 is inserted between the opposed retention arms 26 of each of the universal mounting brackets 20, 40 so that the housing 61 can slide freely along its longitudinal axis between the securing portions 22 of the first and second universal mounting brackets 20, 40 until the final position is located. The fixing elements 30 (e.g., set screws as shown) are then installed in their respective apertures 25 so as to engage against the abutment surfaces 63 to force a back surface 69 of the closer housing 60 against the front surfaces 28 of the brackets 20, 40, thereby capturing and retaining the closer 60 in the final position in the first and second universal mounting brackets 20, 40. In the illustrated embodiment, the fixing elements 30 are cone point set screws. However, the fixing elements 30 can be any fastener of any suitable size, style, or configuration. The fixing elements 30 and fixing element apertures 25 may be omitted in some embodiments, or they can be replaced by other securing means to secure the closer 60 in the final position.

The base 21 of each of the first and second universal mounting brackets 20, 40 defines a plurality of mounting openings, such as slots 24a and/or holes 24b. The number, configuration, and arrangement of the mounting openings are provided so that at least one mounting opening 24, and preferably two more mounting openings, may be aligned with corresponding pre-existing mounting holes on a mounting surface, such as a door or door jamb, Preferably, at least one of the mounting openings in each of the universal mounting brackets is an elongate opening or slot 24a. The alignment of the slots 24a can be in any direction, but it is advantageous, in some embodiments, to include a slot aligned perpendicular to the longitudinal axis of the closer 60 to allow adjustment in a direction other than the direction the closer 60 can slide along the securing portions 22. The number of mounting openings can vary and can be arranged in any configuration, interconnected or non-interconnected, in combination or separately, to align with pre-existing mounting hole patterns 91 (see FIG. 5A) from a previously-installed closer assembly. Thus, new mounting patterns will not need to be drilled into the door or jamb. The mounting holes 24b and slots 24a can be enlarged relative to the thread size and head configuration of mounting fasteners, thus providing a greater range of adaptability for alignment with pre-existing mounting holes in the door or jamb. In assembly, the brackets can also be inverted (i.e., rotated upside down) to accommodate the fastening locations. The mounting holes 24b and slots 24a can advantageously be countersunk, and each can advantageously have a counter-bored depth. Fasteners from the previous closer assembly can also be used to secure the first and second universal mounting brackets 20, 40. Other mounting fasteners with appropriate head configuration, thread size, and overall length can also be used with the door closer assembly to facilitate installation of the universal mounting brackets 20, 40.

The first and second universal mounting brackets 20, 40 can be made of any suitable rigid or semi-rigid metal or non-metallic material, including, but not limited to, aluminum, aluminum alloy (such as grade ADC12), steel, zinc die-cast, aluminum die-cast, formed sheet metal, an assembly of fabricated metal and/or non-metal components, and plastic of the filled and non-filled variety formed by machining, extrusion, molding, or the like.

The universal mounting bracket can be designed with particular draft angles, radii, and fillets to accommodate casting and easy removal from the mold. Secondary machining, such as drilling and tapping holes for the fixing element apertures 25 to receive the fixing elements 30 can be performed. Inserts can also be used in the fixing element apertures 25 to increase installation torque, prevent galling, or add a locking feature. The universal mounting brackets can also be fabricated or casted with features such as alignment aids or identification such as an "A" for the first bracket 20 and a "B" for the second bracket 40.

Referring to FIG. 4, an arm assembly 70 is attached to the rotating gear 68 of the closer 60. The arm assembly 70 can include a main arm 71 coupled to the rotating gear 68, an arm slide 74 rotatably coupled to the main arm 71, a connecting rod 77 slidably attached to the arm slide 74, and an arm bracket 85 rotatably coupled to the connecting rod 77 and fixed to a mounting surface, such as the door, jamb, frame, or wall.

The main arm 71 has a socket 72 at a first end coupled to the rotating gear 68 of the closer 60, and a pin 73 at a second end. The socket 72 can have a shape closely matching the shape of the rotating gear 68 such that the socket 72 is fixed to the rotating gear 68. A fastener and washer assembly 72a can prevent the socket 72 from moving out of engagement with the rotating gear 68.

The arm slide 74 has a socket 75 at a first end rotatably coupled to the pin 73, and an adjustment channel 76 open at a second end and dimensioned to receive a free end 78 of the connecting rod 77, allowing the connecting rod 77 to slide into the channel 76 from the second end of the arm slide 74. A fastener and washer assembly 75a can prevent the socket 75 of the arm slide 74 from moving out of engagement with the pin 73. The adjustment channel 76 can be an exposed channel at a bottom of the arm slide 74 or a hollowed out channel. The adjustment slot 76 can have a window 76a having a width smaller than a width of the sliding portion 78 of the connecting rod 77. A fastener 80 can pass through the window 76a and engage with a threaded hole 81 in the sliding portion 78 of the connecting rod 77 to fasten the connecting rod 77 to the arm slide 74 when a desired location is determined.

Figure 7:
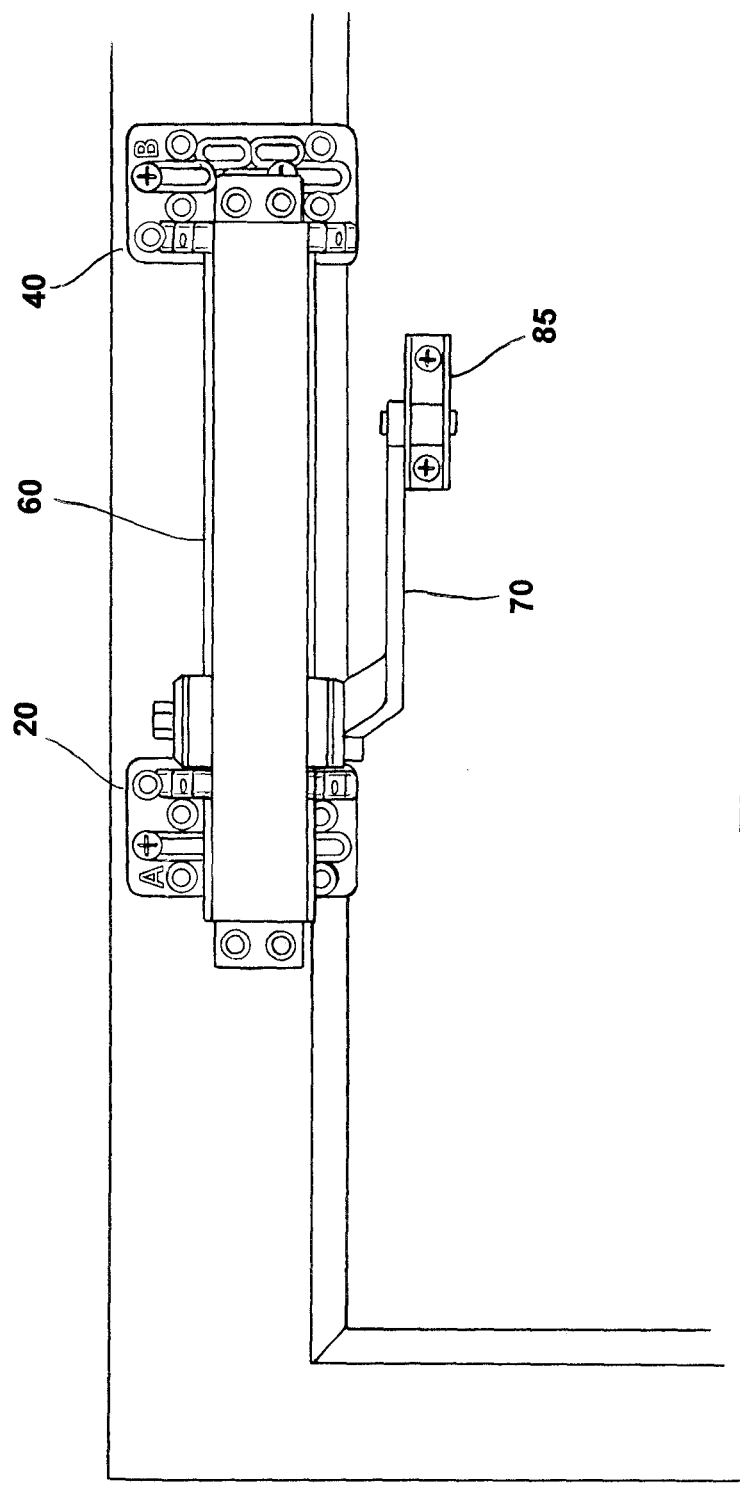
FIG. 7 is a front elevation view of the door closer assembly mounted on a top door jamb in accordance with a jamb-mount installation, with a closer arm attached to the door.
Figure 8:
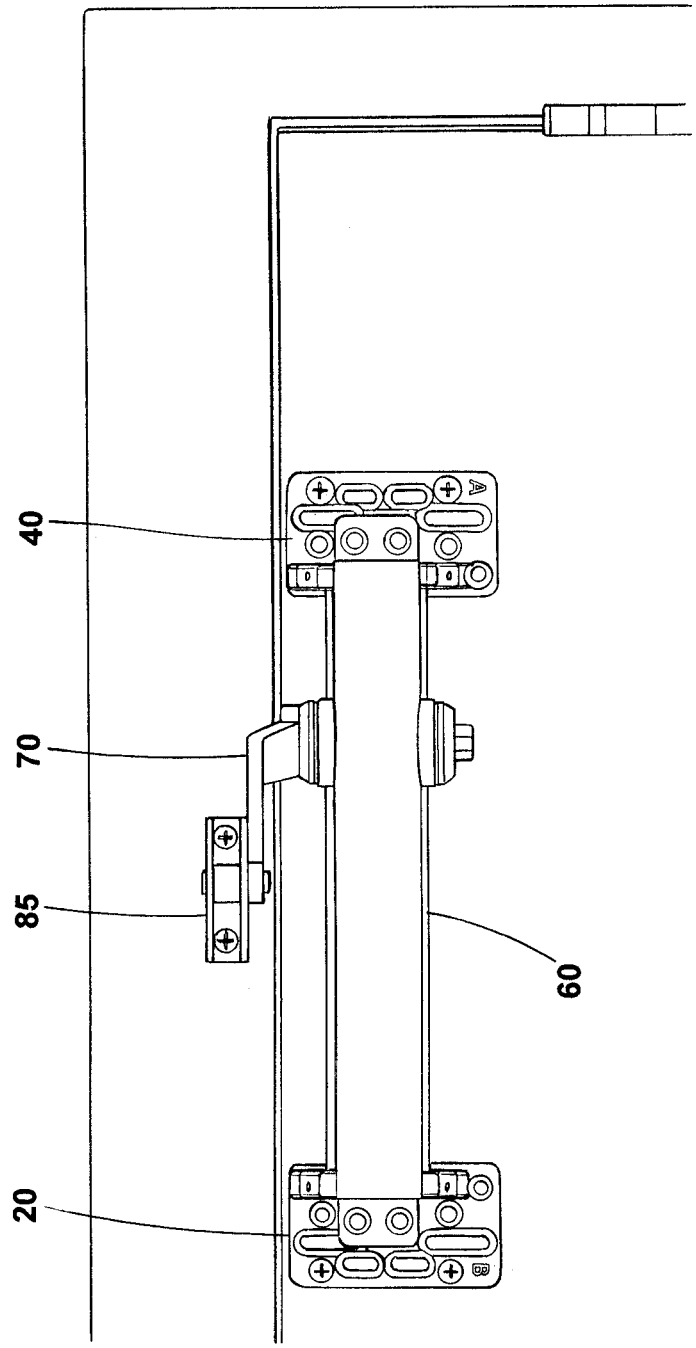
FIG. 8 is front elevation view of the door closer assembly, with the closer housing mounted on the door in a second door-mount installation, with a closer arm attached to the door jamb.

The connecting rod 77 also has a socket 79 at a second end attached to a pin 86 of the arm bracket 85. In the illustrated embodiment, the arm bracket 85 is a soffit plate for a parallel arm door closer configuration. The assembled view of the parallel arm door closer configuration is illustrated in FIG. 6. The arm bracket 85 can also be a mounting foot that is mounted to a door for a top jamb door closer configuration as illustrated in FIG. 7, or mounted to a door jamb for a regular arm door closer configuration as illustrated in FIG. 8.

Figure 5B:
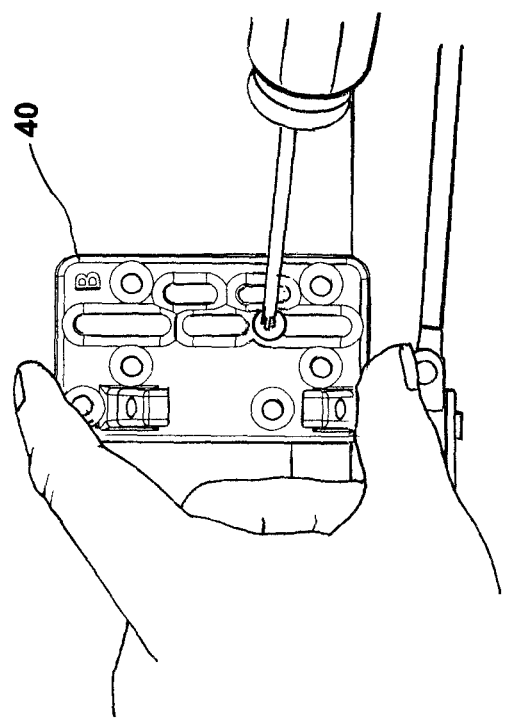
FIGS. 5A-5I illustrate steps in a method of installing the door closer assembly to a door, with a parallel closer arm attached to a top door jamb, in accordance with an embodiment of this disclosure.
Figure 5A:
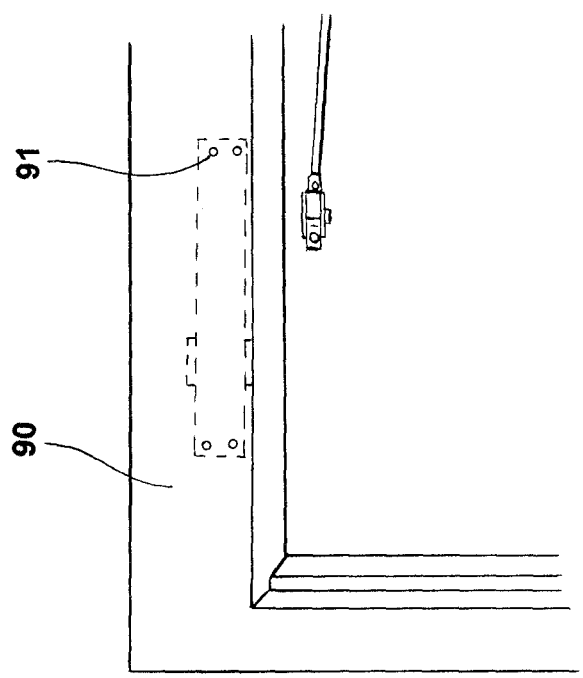

Referring to FIGS. 5A-5I, one embodiment of a method of replacing and installing the door closer assembly to a door is illustrated for a top jamb arm door closer configuration. The method begins by removing a previous door closer assembly from a top door jamb 90. After removing the previous door closer assembly, a pre-existing mounting hole pattern 91 in the jamb 90 should be visible, as shown in FIG. 5A.

The universal mounting brackets 20, 40 are then oriented and placed relative to the pre-existing mounting hole pattern 91 in the jamb 90 so that a mounting hole 24b or slot 24a in each of the brackets 20, 40 is aligned with each of at least two of the holes in the pre-existing hole pattern 91. One of the universal mounting brackets, preferably the universal mounting bracket adjacent to the first (usually longer) side 66 of the closer 60, is lightly mounted to the jamb 90 using pre-existing mounting fasteners or a substitute set, as shown in FIG. 5B.

Figure 5C:
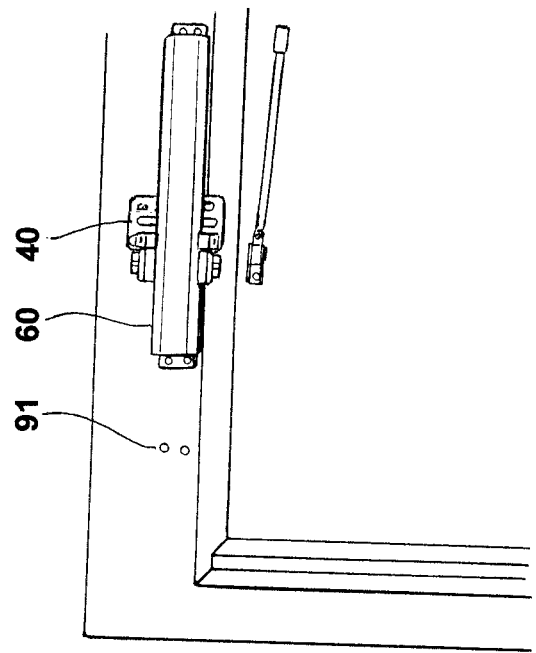

A vertical position of the universal mounting bracket relative to the door opening is determined by measurement to ensure proper mounting position of the door closer assembly on the jamb 90, as shown in FIG. 5C. Once the desired vertical position is obtained, the fasteners are fully tightened to fix the universal mounting bracket to the jamb 90.

Figure 5D:
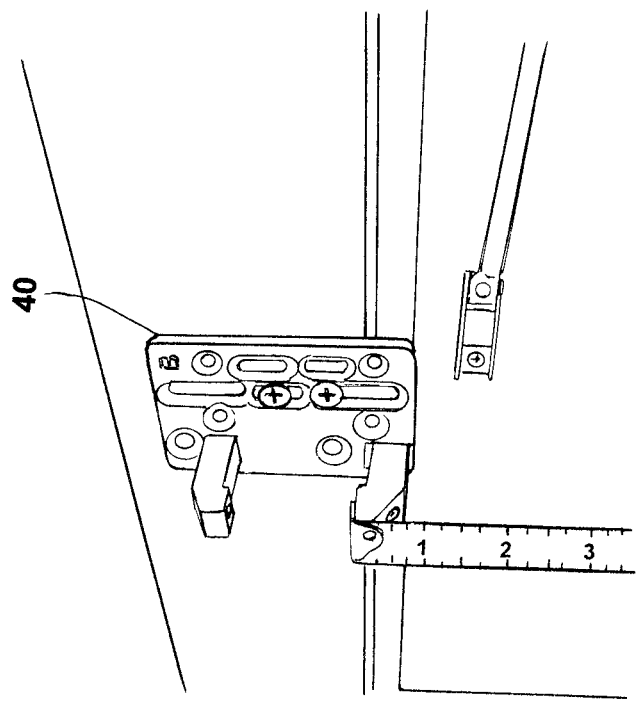

The first (usually longer) portion 66 of the closer 60 is slid into the securing portion 22 of the already-mounted universal mounting bracket as shown in FIG. 5D. The securing portion 22 should hold the closer 60 in place temporarily, before mounting the other universal mounting bracket.

Figure 5E:
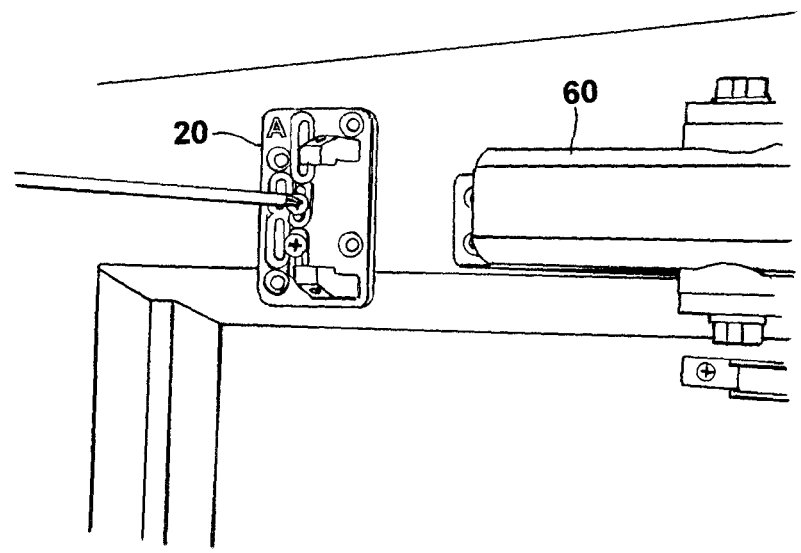
Figure 5F:
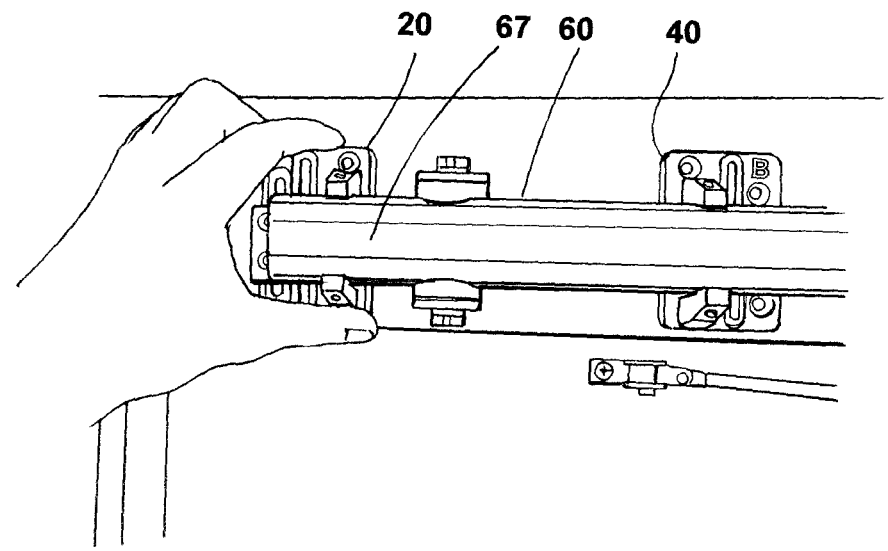

The other universal mounting bracket is positioned over the pre-existing mounting hole pattern 91 and lightly mounted to the jamb 90 as shown in FIG. 5E. The other universal mounting bracket is held in place while sliding the closer 60 through its securing portion 22 to align the other universal mounting bracket. FIG. 5F illustrates the second (usually shorter) portion 67 of the closer 60 sliding through the securing portion 22 of the other universal mounting bracket.

Figure 5G:
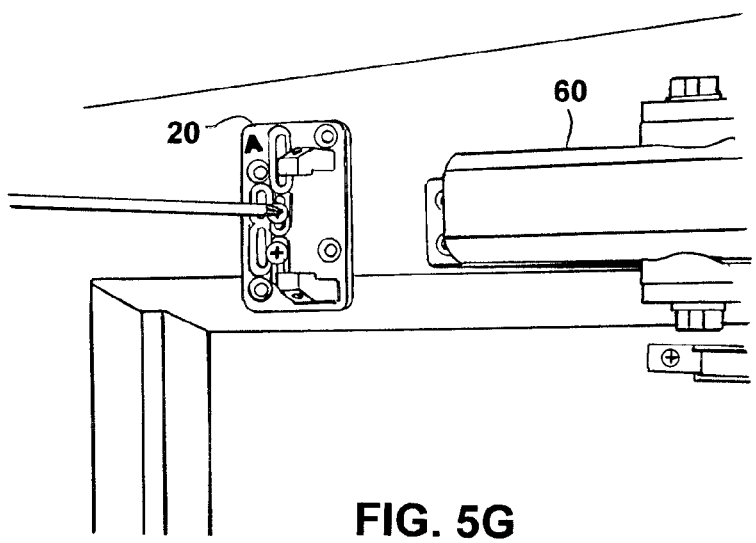

While still holding the second-mounted universal mounting bracket in place, the closer 60 is slid back towards the first-mounted universal mounting bracket to allow the fasteners to be fully tightened for the second-mounted universal mounting bracket to be secured to the jamb 90, as shown in FIG. 5G.

Figure 5H:
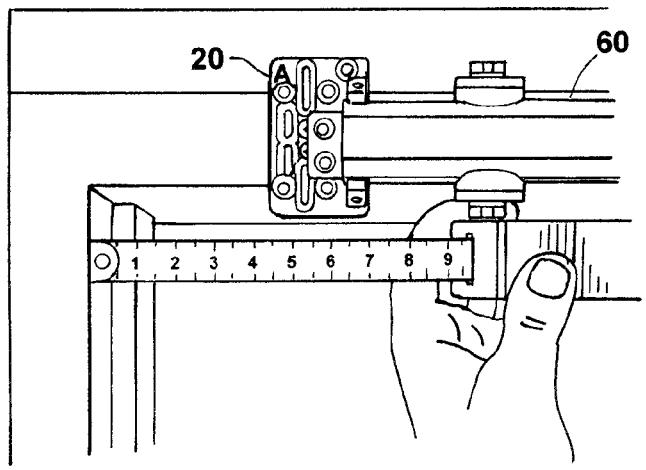

The second (usually shorter) portion 67 of the closer 60 is then slid back through the securing portion 22 of the second-mounted universal mounting bracket to a desired position. Thus, the relative position between the universal mounting brackets can be adapted to align with the pre-existing mounting holes 91 in the door or jamb 90, while at the same time being spaced an appropriate distance apart to provide proper mechanical support and positioning of the closer 60 relative to the door or jamb 90. FIG. 5H shows that the horizontal position of the closer 60 can be determined by measuring a distance between the rotating gear 68 and/or a defined feature or surface of the closer housing 61 and the edge of the door jamb.

Figure 5I:
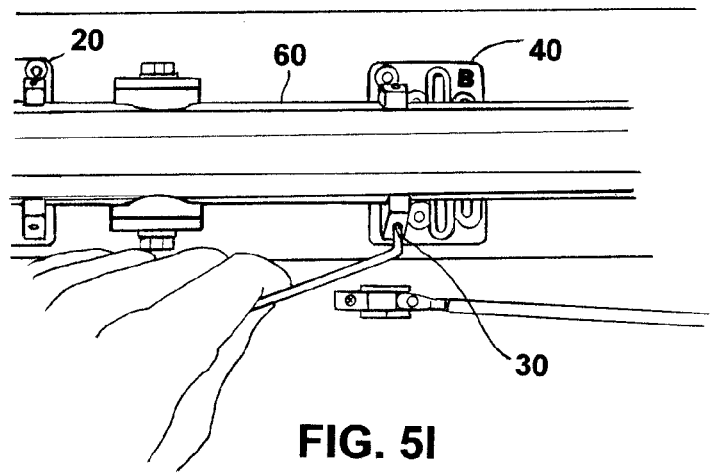

Referring to FIG. 5I, the fixing elements 30 (shown as set screws) can then be tightened against the closer housing 61 to hold the closer 60 in place and prevent the closer from sliding side to side once the installer has positioned the closer 60 in the proper location. The arm assembly 70 is then mounted to the closer and to the door to complete the assembly. The preload on the closer 60 can be adjusted to desired operating settings, such as door opening angle, backcheck, closing, and latching speed. The assembled view of the top jamb door closer configuration with the arm assembly 70 and mounting foot mounted to the door is illustrated in FIG. 7.

The method for replacing and installing the door closer assembly as described in steps 5A-5I can also be applied for replacing a parallel arm door closer configuration illustrated in FIG. 6 using a soffit plate as the arm bracket 85, and can also applied for replacing a regular arm door closer configuration as illustrated in FIG. 8.

A cover (not shown) can be placed over the closer 60 and universal mounting brackets to enhance cosmetic and overall appearance to the final closer installation. Both a covered and non-covered final door closer assembly are encompassed by this disclosure.

The assembled view of FIG. 8 illustrates a regular arm door closer configuration.

The closer and mounting embodiments described above are improvements to simplify and reduce the amount of effort and complexity required in the selection and installation of a door closer. This is achieved by providing a closer assembly and mounting method having a universal mounting device that is installed on the door using the pre-existing drilled and tapped holes from the previous door closer mounting. Further, this improved closer and mounting method reduces the installer's skill level and tool requirements for installation of a closer. This is partially achieved by eliminating the requirement to drill and tap new mounting holes in the door and simplifying the closer selection process.

The use of two separate universal mounting brackets allows universal mounting capabilities for replacing existing door closer assemblies as well as first time door closer installations. Existing door closer assemblies have fixed mounting hole-patterns and mounting fasteners, which can vary widely. Thus, an improved mounting method and door closer assembly eliminate the requirement to drill and tap new mounting holes to achieve complete installation of the present door closer assembly.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A method of installing a replacement door closer assembly including a closer housing, the method comprising:
   (a) removing a previous door closer assembly from a mounting surface on either a door or a door jamb;
   (b) fixing a first mounting bracket to the mounting surface through a first pre-existing mounting hole in the mounting surface;
   (c) sliding the closer housing of the replacement door closer assembly through the first mounting bracket such that a portion of the closer housing moves away from the first mounting bracket;
   (d) sliding the closer housing such that the portion of the closer housing moves back toward the first mounting bracket;
   (e) fixing a second mounting bracket to the mounting surface through a second pre-existing mounting hole in the mounting surface;
   (f) positioning the closer housing by sliding the closer housing between a first securing portion of the first mounting bracket and a second securing portion of the second mounting bracket, the first and second securing portions being configured for gripping the closer housing; and
   (g) securing the closer housing to the first and second mounting brackets at a final position.

2. The method of claim 1, wherein each of the first and second mounting brackets includes a base, the method further comprising pressing the closer housing against the base of each of the first and second mounting brackets.

3. The method of claim 2, wherein the closer housing includes abutment surfaces, the method further comprising using set screws to press the abutment surfaces of the closer housing at an inward angle against the first and second mounting brackets to secure the closer housing to the first and second mounting brackets at the final position.

4. The method of claim 3, wherein the abutment surfaces are positioned opposed and aligned symmetrically relative to each other.

5. The method of claim 4, wherein each abutment surface is a stepped inclined surface.

6. The method of claim 4, wherein the abutment surfaces extend along an entire length of the closer housing forming a pair of continuous and unbroken abutment surfaces.

7. The method of claim 1, wherein the step of fixing the first mounting bracket comprises:
   using untightened fasteners to mount the first mounting bracket in an adjustable position on the mounting surface;
   adjusting the adjustable position of the first mounting bracket to a desired position on the mounting surface; and
   tightening the fasteners to fix the first mounting bracket in the desired position.

8. The method of claim 7, further comprising aligning the second mounting bracket by sliding the closer housing through the second mounting bracket to align the second mounting bracket with the first mounting bracket.

9. The method of claim 1, wherein the step of securing the closer housing to the first and second mounting brackets at the final position comprises gripping the closer housing with the first and second securing portions.

10. The method of claim 9, wherein each of the first and second securing portions comprises a pair of arms, each arm comprising an extending portion and a securing lip configured for restricting the closer housing to movement along a longitudinal axis.

11. A method of installing a door closer assembly including a closer housing to a mounting surface on a door or a door jamb, the method comprising:
   aligning a first opening in a first mounting bracket to a first pre-existing mounting hole in the mounting surface;
   fixing the first mounting bracket to the mounting surface through the first opening and the first pre-existing mounting hole;
   sliding the closer housing of the door closer assembly through the first mounting bracket and a second mounting bracket such that a portion of the closer housing moves away from the first mounting bracket;
   aligning a second opening in the second mounting bracket relative to a second pre-existing mounting hole in the mounting surface;
   sliding the closer housing such that the portion of the closer housing moves back toward the first mounting bracket;
   fixing the second mounting bracket to the mounting surface through the second opening and the second pre-existing mounting hole;
   positioning the closer housing by sliding the closer housing between the first mounting bracket and the second mounting bracket; and
   securing the closer housing to the first and second mounting brackets at a final position on the mounting surface.

12. The method of claim 11, wherein each of the first and second mounting brackets includes a base, the method further comprising pressing the closer housing against the bases of the first and second mounting brackets.

13. The method of claim 11, wherein the step of securing the closer housing comprises engaging a fixing element in a first securing portion of the first mounting bracket and in a second securing portion of the second mounting bracket.

14. The method of claim 13, wherein the fixing element is angled inwardly at an angle relative to the mounting surface to force the closer housing against a front surface of the first mounting bracket and a front surface of the second mounting bracket.

15. The method of claim 11, wherein a securing portion of the first mounting bracket and a securing portion of the second mounting bracket grip the closer housing at the final position.

16. The method of claim 15, wherein each securing portion comprises a pair of retention arms, and wherein the closer housing is secured at the final position between the pairs of retention arms.

17. The method of claim 11, wherein the first opening is one of a first pattern of openings in the first mounting bracket, and the second opening is one of a second pattern of openings in the second mounting bracket, wherein the second pattern of openings is a mirror image of the first pattern of openings.

18. The method of claim 11, wherein the step of fixing the first mounting bracket further comprises:
   mounting the first mounting bracket so as to have an adjustable position on the mounting surface;
   adjusting the adjustable position of the first mounting bracket on the mounting surface to a desired position; and
   fixing the first mounting bracket to the mounting surface at the desired position.

\* \* \* \* \*